United States Patent [19]

Kinoshita et al.

[11] Patent Number: 5,009,481
[45] Date of Patent: Apr. 23, 1991

[54] OPTICAL MODULE AND METHOD OF MANUFACTURING SAME

[75] Inventors: Kitoshi Kinoshita, Inagi; Hiroatsu Aoki, Kawasaki, both of Japan

[73] Assignee: Fujitsu Limited, Kawasaki, Japan

[21] Appl. No.: 398,825

[22] Filed: Aug. 23, 1989

[30] Foreign Application Priority Data

Aug. 23, 1988 [JP] Japan ................. 63-207391
Aug. 11, 1989 [JP] Japan ................. 1-207005

[51] Int. Cl.⁵ ............................................. G02B 6/32
[52] U.S. Cl. ........................................... 350/96.18
[58] Field of Search ............. 350/96.15, 96.17, 96.18

[56] References Cited

U.S. PATENT DOCUMENTS

| | | | |
|---|---|---|---|
| 4,790,618 | 12/1988 | Abe | 350/96.18 |
| 4,818,053 | 4/1989 | Gordon et al. | 350/96.18 |
| 4,842,360 | 6/1989 | Caro et al. | 350/96.18 |
| 4,842,391 | 6/1989 | Kim et al. | 350/96.18 |

Primary Examiner—William L. Sikes
Assistant Examiner—Robert E. Wise
Attorney, Agent, or Firm—Staas & Halsey

[57] ABSTRACT

An optical module in which light emitted from a light emitting element fixed to a substrate is made incident on an optical fiber through an optical lens, including a lens holder which immovably supports the optical lens, and a lens holder guide fixed to the substrate to support the lens holder. The invention is also directed to a method of manufacturing an optical module including moving the holder guide and the lens holder on the substrate and in the lens holder guide, in orthogonal x-y directions and in a z-direction perpendicular to the x-y directions, respectively, to adjust the position of the lens, so that the light emitted from the light emitting element is incident on the optical fiber, and then fixing the lens holder guide and the lens holder to the substrate and the lens holder guide, respectively.

17 Claims, 4 Drawing Sheets

Fig. 9
PRIOR ART
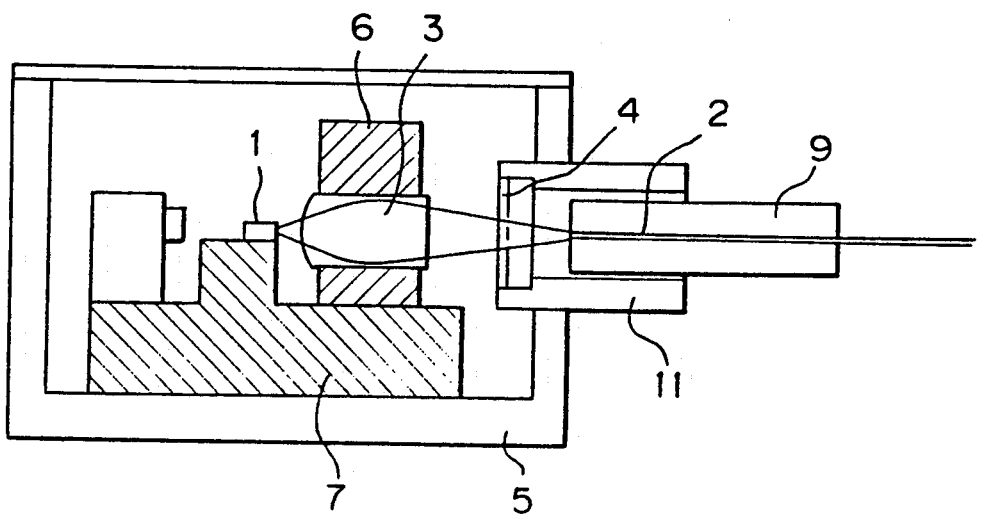
Fig. 10
PRIOR ART
Fig. 11
PRIOR ART
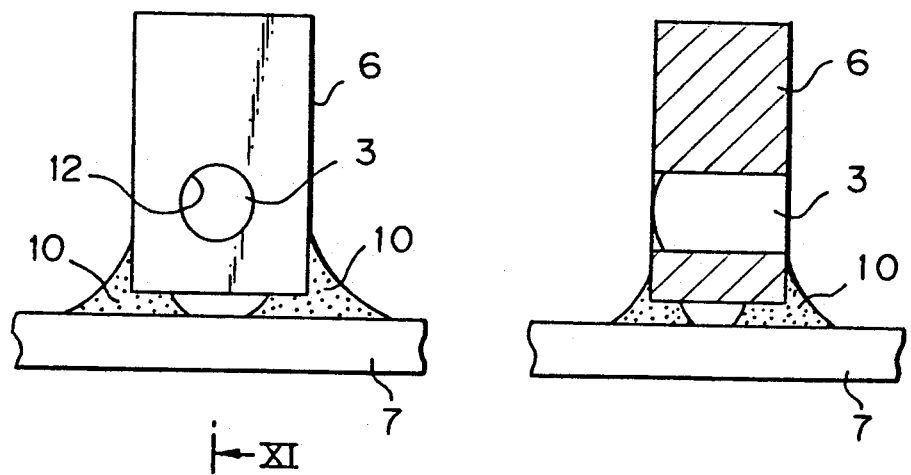

OPTICAL MODULE AND METHOD OF MANUFACTURING SAME

BACKGROUND OF THE INVENTION

1. Field of the Invention

The present invention relates to an optical module used in an optical communication system, and a method of manufacturing the same.

An optical module provides a parallel beam of light which is emitted from a light emitting element through an optical lens and converged at a focal point of the lens at which an optical fiber is located, and such an optical module must be subjected to various environmental tests of the quality and reliability thereof.

2. Description of the Related Art

FIG. 9 shows a known optical module in which a light emitting element 1 is supported on a substrate (carrier) 7 and outputs light to an optical fiber 2 supported by a ferrule 9, through a converging lens 3 or a lens unit having a converging lens 3. The ferrule 9 of the optical fiber 3 is inserted and supported in a support 11 having a glass window 4, which defines an air-sealed chamber in a housing 5 of the module to isolate the light emitting element 1 from the environment. The substrate 7 and the support 11 are secured to the housing 5, and the lens 3 is supported by a lens holder 6 immovably supported by the substrate 7.

The light emitted from the light emitting element 1 is converged onto the focal point of the converging lens 3 to be incident on the optical fiber 2, whereby an optical connection is established between the light emitting element 1 and the optical fiber 2.

To converge the light emitted from the light emitting element 1 and incident on the front end of the optical fiber 1, through the converging lens 3, the position of the lens 3 must be precisely adjusted. To allow this adjustment to be made, first the lens 3 is immovably soldered to or press-fitted in a lens insertion hole 12 (FIGS. 10 and 11) of the lens holder 6, the lens holder 6 is then moved up and down and right and left with respect to the substrate 7 by an adjusting tool or jig or the like (not shown) to adjust the position of the lens 3, and after the adjustment is completed, the lens holder 6 is secured to the substrate 7 by an adhesive or solder 10, as shown in FIGS. 10 and 11.

In the conventional optical module as shown in FIGS. 9, 10, and 11, the center of the lens insertion hole 12 is offset from the center of the lens holder 6 toward the bottom of the lens holder 6 facing the upper surface of the substrate 7, to allow for any necessary downward movement of the lens holder 6 during the adjustment of the position of the lens 3, and thus, usually, a slight clearance remains between the bottom of the lens holder 6 and the substrate 7 after the adjustment is completed. This clearance is filled with the solder (or adhesive) 10.

Consequently, even though the lens holder 6, and accordingly the lens 3, are exactly positioned by the adjusting operation as mentioned above, an accidental and undesirable displacement or deviation of the lens 3 could occur due to a creep of the solder (or adhesive) 10 caused by a thermal stress during the environmental tests, to thereby cause a misalignment of the optical connection.

SUMMARY OF THE INVENTION

The primary object of the present invention is to provide an improved optical module in which an accidental displacement or deviation of a lens after adjustment is prevented, particularly when the optical module is subject to a temperature cycle test.

Another object of the present invention is to provide an improved method of manufacturing an optical module in which the lens can be reliably secured to the substrate (carrier) without an accidental undesirable displacement or deviation of a lens.

Therefore, according to one aspect of the present invention, there is provided an optical module by which light emitted from a light emitting element secured to a substrate is made incident on an optical fiber by an optical lens, comprising a lens holder which immovably supports the optical lens, and a lens holder holding member (e.g., guide or plate) fixed to the substrate to support the lens holder.

According to another aspect of the present invention, there is provided a method of manufacturing an optical module by which light emitted from a light emitting element secured to a substrate is made incident on an optical fiber by a converging lens, in which the lens is secured to a lens holder which is movably guided in a lens holder holding member movable on the substrate, wherein the method comprises moving the lens holder holding member and the lens holder on the substrate and in the lens holder holding member, in orthogonal x-y directions and in a z-direction perpendicular to the x-y directions, respectively, to adjust the position of the lens, so that the light emitted from the light emitting element is incident on the optical fiber, and then securing the lens holder holding member and the lens holder to the substrate and the lens holder holding member, respectively.

With this arrangement, since the lens holder is movably supported by the lens holder holding member with respect to the substrate, the holding member can be secured to the substrate without any clearance therebetween, and thus the accidental displacement or deviation of the lens, which would otherwise occur when the device is located in a thermal environment after adjustment, can be prevented.

BRIEF DESCRIPTION OF THE DRAWINGS

The invention will be described below in detail with reference to the accompanying drawings, in which:

FIG. 9 is a partially sectioned front elevational view of a known optical module;

FIG. 10 is a schematic view of a known optical module, explaining how a lens holder is secured to a substrate; and, FIG. 11 is a sectional view taken along the line XI—XI in FIG. 10.

DESCRIPTION OF THE PREFERRED EMBODIMENTS

Figure 1:
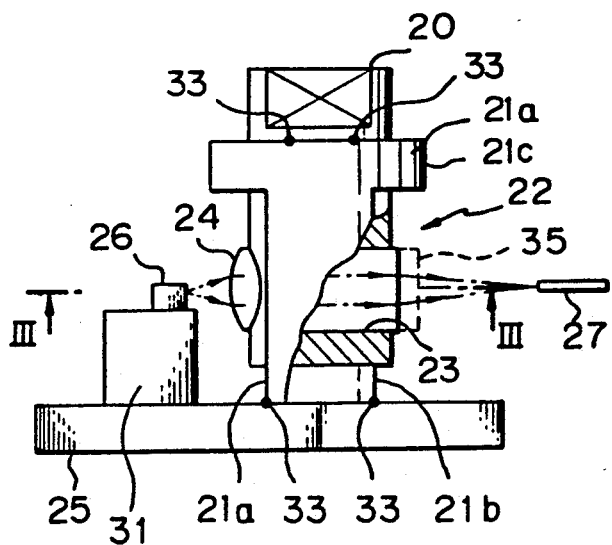
FIG. 1 is a front elevational view of an optical module according to an aspect of the present invention.

The optical module according to the present invention comprises a lens securing assembly 22 which includes a hollow lens holder 20 and a lens holder guide (holding member) 21. The lens holder 20 and the lens holder guide 21 are made, for example, of stainless steel or Kovar (Co.Fe.Ni alloy) (trade name), or the like. The lens holder 20 has a cylindrical body having a diameter of about 2-5 mm, and is provided with a lens insertion hole 23 extending therethrough in a direction perpendicular to the axis of the cylindrical body to hold a lens 24 inserted therein. The lens (or lens unit) 24, which has a diameter of about 1-2 mm in the illustrated embodiment, is press-fitted in or secured by a solder to the lens insertion hole 23 of the lens holder 20. The lens holder guide 21 has a cylindrical upper portion 21c and lower parallel side face portions 21a and 21b, and defines therein a cylindrical bore 21d in which the lens holder 20 is snugly and slidably fitted without play. Preferably, the clearance between the outer periphery of the lens holder 20 and the peripheral wall of the cylindrical bore 21 is less than 50μ.

The light emitting element 26 formed, for example, by a laser diode composed of InP and InGaAsP semiconductor, is immovably supported on a support 31 made, for example, of aluminum oxide, aluminum nitride, copper, copper-tungsten alloy or the like, and fixed to the substrate 25 made, for example, of stainless steel or Kovar, or the like.

Figure 2:
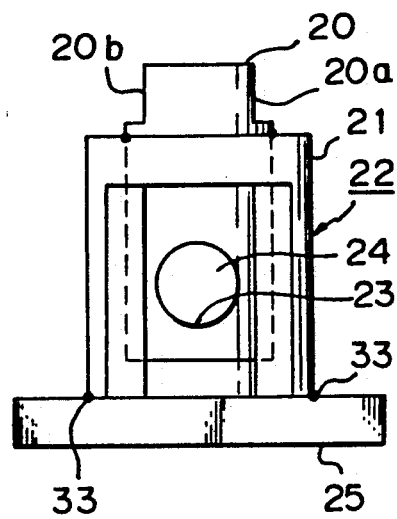
FIG. 2 is a front elevational view of FIG. 1.
Figure 3:
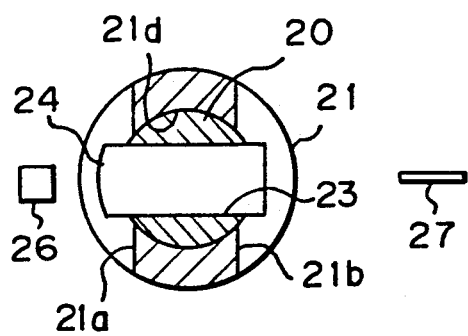
FIG. 3 is a partial sectional view taken along the line III—III in FIG. 1.
Figure 4:
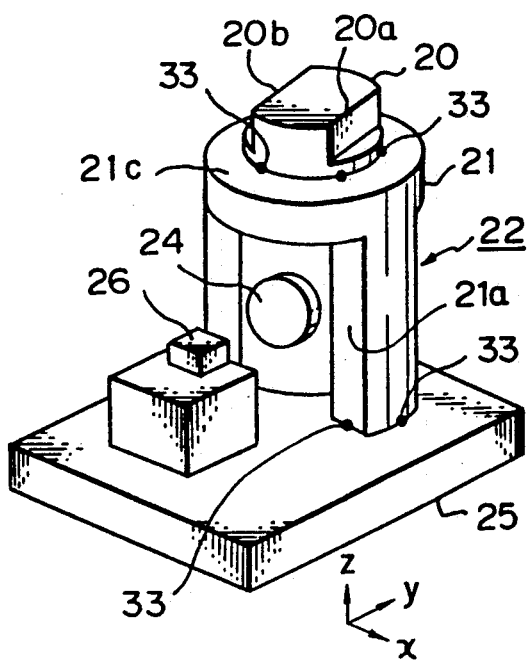
FIG. 4 is a perspective view of an optical module shown in FIG. 1.

First, the lens holder guide 21 is movably located on the substrate 25, then the lens holder 20, which has the lens 24 integrally attached thereto, is fitted in the lens holder guide 21, the lens holder guide 21 is moved in the orthogonal x-y directions on the surface plane of the substrate 25, and the lens holder 20 is moved up and down in the lens holder guide 21 in the z-direction perpendicular to the x-y directions, so that light emitted from the light emitting element 26 is incident on the optical fiber 27 at the front end thereof. The optical fiber 27 is, for example, a single-mode fiber having a core diameter of 10 μm. The incidence of light on the optical fiber can be detected by an optical detector known per se (not shown) connected to the opposite end of the optical fiber 27 to detect the quantity of light received thereby. Note, since the subject of the present invention is not directed to the detection of the incidence of light upon the optical fiber, a detailed explanation thereof is not given herein. When the adjustment of the position of the lens 24 by moving the lens holder guide 21 and the lens holder 20 is completed, the lens holder guide 21 and the lens holder 20 are secured to the substrate 25 and the lens holder guide 21 by a solder or by laser welding shown at 33 in FIGS. 1, 2, and 4, respectively. In the illustrated embodiment, the distance between the light emitting element 26 and the lens 24 is 0.01 mm-0.5 mm. Note that an isolator or filter 35 (FIG. 1) can be provided between the lens 24 and the optical fiber 27.

According to the present invention, during the above-described adjustment (alignment of the optical axis), the lens holder guide 21 is slid on the substrate 25 without any clearance therebetween as mentioned above, and accordingly, no adhesive (or solder) is filled in a clearance produced between the lens holder and the substrate as in the above-mentioned prior art shown in FIGS. 9, 10 and 11, in which a lens holder guide is not provided. Accordingly, laser welding can be used to secure the lens holder guide 21 to the substrate 25. Note if solder is filled between the lens holder guide and the substrate, laser welding cannot be performed, as is well known.

Similarly, since there is substantially no clearance between the lens holder 20 and the lens holder guide 21, they can be integrally connected to each other by laser welding.

Further, because a solder or adhesive is not filled between the lens holder guide 21 and the substrate 25, no creep of the solder or adhesive can occur during the environment tests (e.g., a temperature cycle test of $-40°$ C.-$+90°$ C.), and thus a displacement or deviation of the optical axis, which has been adjusted, cannot occur and an increased reliability and quality of an optical module is obtained.

The laser welding points are in a symmetrical arrangement in which preferably all of the welding points and at least the diametrically opposed welding points are welded simultaneously, to absorb any irregular thermal distortion due to heat from the laser welding. The laser welding can be realized, for example, by a YAG laser known per se.

Preferably, the welding of the lens holder 20 to the lens holder guide 21 is first effected and then the lens holder guide 21 is welded to the substrate 25.

Figure 5:
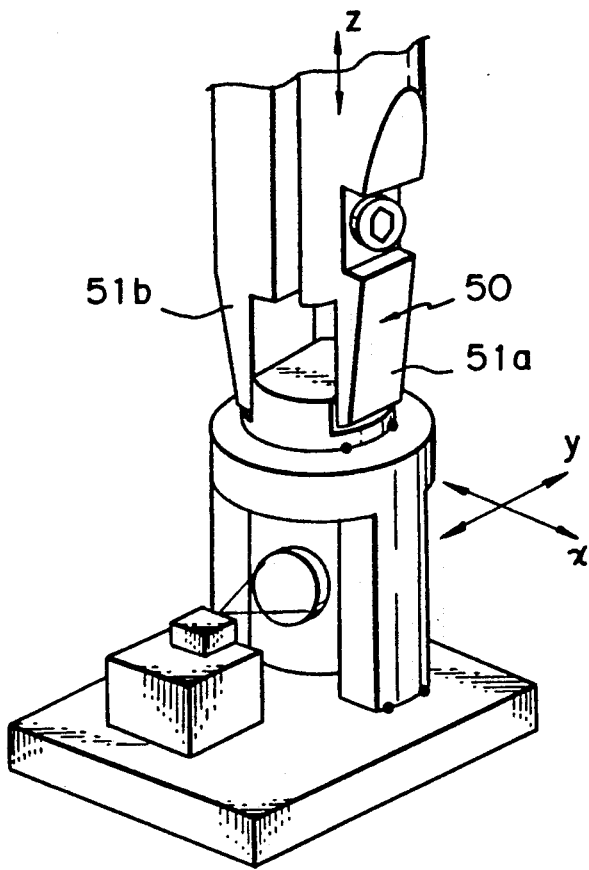
FIG. 5 is a perspective view of a tool for clamping and moving an optical module shown in FIGS. 1 through 4.

FIG. 5 shows an example of a tool 50 having opposed clamping arms 51a and 51b which can be opened and closed to separate from and come close to each other to clamp the lens holder 20. Preferably, the lens holder 20 has opposed parallel flat surface portions 20a and 20b at the upper end thereof, so that the clamping arms 51a and 51b can firmly and stably clamp the surface portions 20a and 20b. The tool 50 is operatively connected to a drive (not shown) to be moved in the x-y directions and up and down in the z-direction. Consequently, the lens holder 20 can be moved together with the lens holder guide 21 in the x-y directions on the substrate 25 by the tool 50, before the lens holder guide 21 is welded to the substrate 25. In addition, the lens holder 20 can be also moved up and down relative to the lens holder guide 21 before the lens holder 20 is welded to the lens holder guide 21.

The adjustment, of course, can be effected by a manual operation without the use of the tool 50.

Figure 6:
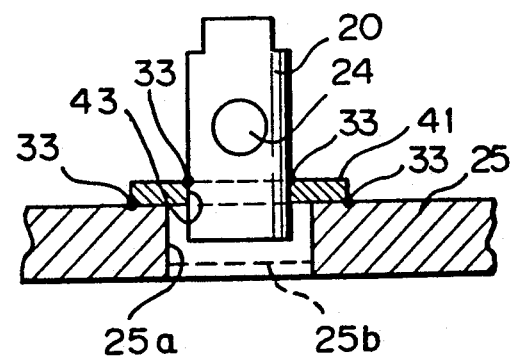
FIG. 6 is a sectional view of a main part of an optical module according to another embodiment of the present invention.

FIG. 6 shows another embodiment of the present invention, in which the lens holder guide 21 shown in FIGS. 1 through 4 is replaced by a lens holder plate 41 having a through hole 43 in which the lens holder 20 holding the lens 24 is snugly inserted and secured. The substrate 25 has an opening 25a in which the lower portion of the lens holder 20 can be inserted. The opening 25a has a diameter larger than the diameter of the cylindrical lens holder 20, so that the lens holder 20 can be moved in the x-y directions together with the plate 41. The opening 25a can be replaced by a bottomed recess 25b, as shown by an imaginary line in FIG. 6. After the adjustment of the position of the lens holder 20 to the lens holder plate 41 in the z-direction, the lens holder 20 is welded to the lens holder plate 41 by laser welding as shown at 33. Similarly, after the adjustment of the position of the lens holder plate 41 to the substrate 25 in the x-y direction, the lens holder plate 41 is welded to the substrate 25 by laser welding as shown at 33. The lens holder 20 can be moved by a manual operation or by the tool 50 shown in FIG. 5.

Figure 8:
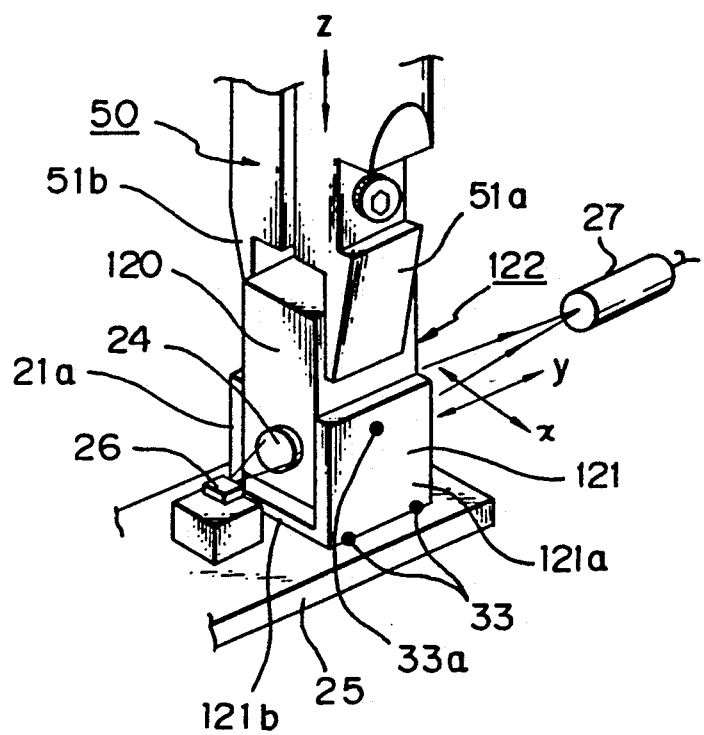
FIG. 8 is a perspective view of an optical module to which a clamping tool is attached, according to another embodiment of the invention.

FIG. 8 shows still another embodiment of the present invention, in which elements corresponding to those in FIGS. 1-5 are designated with the same reference numerals.

In FIG. 8, the lens securing assembly 122 has a parallelepiped lens holder 120 and a generally angular U-shaped lens holder guide (holding member) 121 having opposed side wall plates 121a and a bottom plate 121b. The lens holder 120 and the lens holder guide 121 are made, for example of stainless steel, Koval, or the like, similarly to the aforementioned embodiments.

The lens holder 120 and the lens holder guide 121 are different in shape from the lens holder 20 and the lens holder guide 21 of the above-mentioned embodiment shown in FIGS. 1 through 4, respectively.

Namely, both the lens holder 120 and the lens holder guide 121 have a generally angular shape, so that the lens holder 120 can be snugly fitted in the lens holder guide 121. The lens holder guide 121 is secured to the substrate 25 by laser welding shown at 33, similarly to the embodiment shown in FIGS. 1 through 4. The clamping tool 50, which has the clamping arms 51a and 51b, can easily grasp the opposite parallel flat side walls of the lens holder 120. The lens holder 120 is movable in directions (i.e., y-direction in FIG. 8) parallel to the planes of the side walls 121 and in the vertical directions (up and down) perpendicular to the x-direction or y-direction, relative to the lens holder guide 121. However, the movement of the lens holder 120 in the direction (i.e., x-direction in FIG. 8) perpendicular to the planes of the side wall plates 121a is restricted by the side wall plates 121a.

Preferably, the lens holder guide 121 is first welded to the substrate 25 by a YAG laser welding process, and the lens holder 120 is then secured to the lens holder guide 121 by a YAG laser welding as shown at 33a in FIG. 8 after the positional adjustment of the lens holder 120 with respect to the lens holder guide 121 is completed. The welding between the lens holder 120 and the lens holder guide 121 is effected in opposite directions perpendicular to the planes of the side wall plates 121a of the lens holder guide 121, as shown at 33a in FIG. 8. Namely, the laser is made incident upon the side wall plates of the lens holder guide 121 in a direction perpendicular thereto.

Generally speaking, when two members are welded to each other by a YAG laser welding, an inevitable slight displacement of the two members takes place due to fusion of the materials of the members upon welding. It is also, however, known that such an undesirable displacement does not occur when the laser is incident upon the two members at a right angle thereto, i.e., in the direction perpendicular to the planes thereof. In view of this fact, the embodiment illustrated in FIG. 8 is more advantageous for eliminating the undesirable displacement of the lens holder 120 and the lens holder guide 121, which would otherwise occur upon YAG laser welding.

Figure 7:
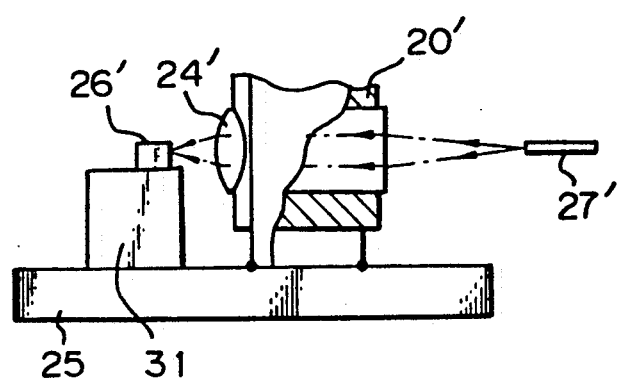
FIG. 7 is a partial view of an optical module according to still another embodiment of the present invention.

The present invention is applicable not only to an optical system in which light emitted from a light emitting element is converged onto an optical fiber through a lens unit, as mentioned above, but also to an optical system in which light coming from the optical fiber is converged onto a light receiving element through an optical lens unit, as shown in FIG. 7. In FIG. 7, light transmitted through the optical fiber 27' is converged onto a light receiving element 26' through an optical lens unit 24'.

Namely, in an arrangement shown in FIG. 7, the adjustment of the lens holder 20' having the lens unit 24', with respect to the light receiving element 26', can be effected by the same process as mentioned above.

We claim:

1. An optical module having a substrate, an optical lens defining an optical axis, a light emitting element and an optical fiber, and in which light emitted from the light emitting element, secured to the substrate, is made incident on the optical fiber by, and along the optical axis of the optical lens, comprising a lens holder having a cylindrical shape and defining a corresponding cylindrical axis of said lens holder, said lens holder including a lens insertion hole which extends in a direction perpendicular to the cylindrical axis of the lens holder, and in which the optical lens is immovably mounted with the optical axis thereof perpendicular to the cylindrical axis of the lens holder, and a lens holder holding member having a cylindrical shape, said lens holder holding member being fixed to the substrate to support said lens holder and having a sidewall defining an interior recess configured for coaxially receiving the lens holder therein and for exposing the optical lens in the direction along the optical axis thereof, said interior recess corresponding to and telescopingly receiving therein the lens holder.

2. An optical module according to claim 1, wherein said lens holder is configured for snugly fitting in said lens holder holding member.

3. An optical module according to claim 1, wherein said lens holder holding member is fixed to the substrate by laser welding.

4. An optical module according to claim 1, wherein said lens holder is fixed to the lens holder holding member by laser welding.

5. An optical module in which light emitted from a light emitting element secured to a substrate is made incident on an optical fiber through an optical lens, comprising a lens holder which immovably supports the optical lens, and a lens holder holding member which is a plate fixed to the substrate to support the lens holder, said lens holder plate having an opening in which the lens holder is snugly inserted.

6. An optical module according to claim 5, wherein said substrate has an opening in which the lens holder is movably received.

7. An optical module in which light emitted from a light emitting element secured to a substrate is made incident on an optical fiber through an optical lens, comprising a lens holder which immovably supports the optical lens, and a lens holder holding member which is a generally angular U-shaped lens holder guide having opposite parallel flat side walls and fixed to the substrate to support the lens holder.

8. An optical module according to claim 7, wherein said lens holder has a parallelepiped body which can be snugly fitted in the lens holder guide.

9. An optical module according to claim 8, wherein said lens holder and the lens holder guide are welded to each other by laser welding in which a laser is made incident upon the side walls of the lens holder guide at a right angle thereto.

10. A method of manufacturing an optical module in which light emitted from a light emitting element fixed to a substrate is made incident on an optical fiber through an optical lens, in which the lens is secured to a lens holder movably supported in a lens holder holding member movably supported on the substrate, wherein the method comprises moving the lens holder holding member and the lens holder in orthogonal x-y directions on the substrate and moving the lens holder in a z-direction perpendicular to the x-y directions in the lens holder holding member, to adjust the position of the lens, so that the light emitted from the light emitting element is incident on the optical fiber, and then fixing the lens holder holding member and the lens holder to the substrate and the lens holder holding member, respectively.

11. A method according to claim 10, wherein said lens holder holding member is fixed to the substrate by laser welding.

12. A method according to claim 11, wherein said lens holder is fixed to the lens holder holding member by laser welding.

13. An optical module in which light emitted from a light emitting element secured to a substrate is made incident on an optical fiber along an optical axis through an optical lens, comprising a lens holder which immovably supports the optical lens, and a lens holder holding member having a cylindrical annular recess for receiving said lens holder, said lens holder holding member axially extending in a direction perpendicular to the optical axis and fixed to the substrate to support said lens holder.

14. An optical module according to claim 13, wherein said lens holder has a cylindrical shape, so that it can be snugly fitted in said lens holder holding member.

15. An optical module according to claim 14, wherein said lens holder has a lens insertion hole which extends therethrough in a direction perpendicular to an axis of the cylindrical shape of the lens holder, so that the lens is inserted in the lens insertion hole.

16. An optical module according to claim 15, wherein said lens holder holding member is fixed to the substrate by laser welding.

17. An optical module according to claim 15, wherein said lens holder is fixed to the lens holder holding member by laser welding.

* * * * *